United States Patent [19]

Quick et al.

[11] 4,223,226
[45] Sep. 16, 1980

[54] FIBER OPTIC TEMPERATURE SENSOR

[75] Inventors: William H. Quick, La Habra; Rudolf R. August, Laguna Beach; Kenneth A. James, Corona Del Mar; Virgil H. Strahan, Jr., Orange; Donald K. Nichols, Long Beach, all of Calif.

[73] Assignee: Rockwell International Corporation, El Segundo, Calif.

[21] Appl. No.: 928,223

[22] Filed: Jul. 26, 1978

[51] Int. Cl.² .................. F21V 9/16; G01N 21/64
[52] U.S. Cl. .................... 250/458; 73/355 R; 250/461 R
[58] Field of Search .............. 250/461 R, 458, 459; 73/355 R, 356

[56] References Cited

U.S. PATENT DOCUMENTS

| 2,551,650 | 5/1951 | Urbach | 73/355 R |
|---|---|---|---|
| 2,945,954 | 7/1960 | Gaugler | 250/459 |
| 3,215,846 | 11/1965 | McNaney | 250/213 |
| 3,256,518 | 6/1966 | Crane | 73/356 |
| 3,315,160 | 4/1967 | Goodman | 324/73 R |
| 4,075,493 | 2/1978 | Wickersheim | 250/461 R |

Primary Examiner—Davis L. Willis
Attorney, Agent, or Firm—H. Fredrick Hamann; Richard A. Bachand

[57] ABSTRACT

An inexpensive, lightweight fiber optic micro-sensor that is suitable for applications which may require remote temperature sensing. The disclosed temperature sensor includes a phosphor material that, after receiving incident light stimulation, is adapted to emit phosphorescent radiation output signals, the amplitude decay rate and wavelength of which are functions of the sensed temperature.

4 Claims, 9 Drawing Figures

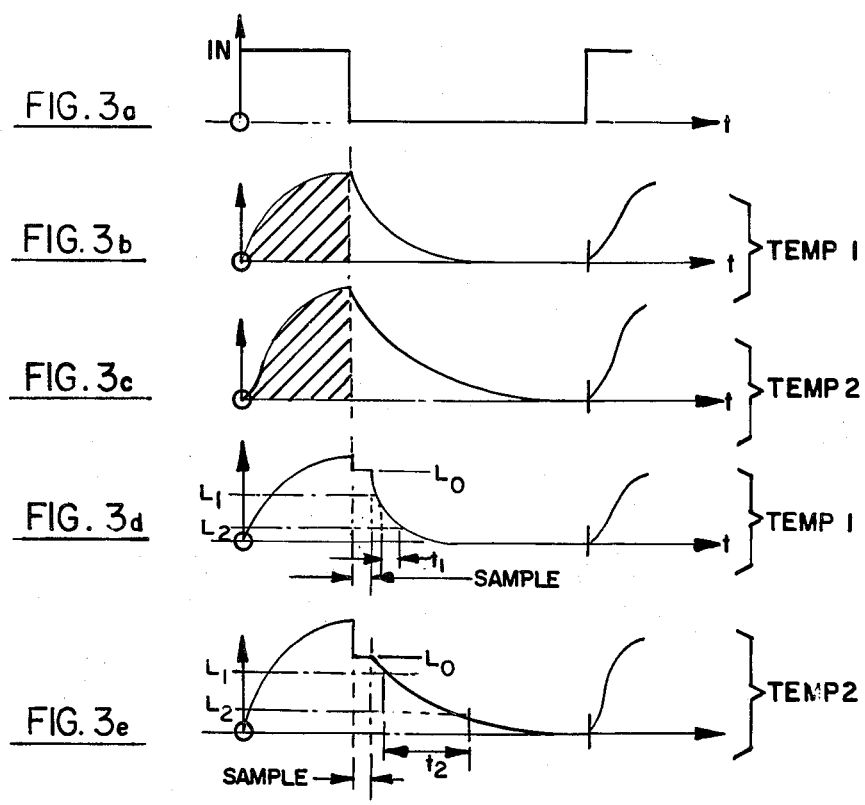
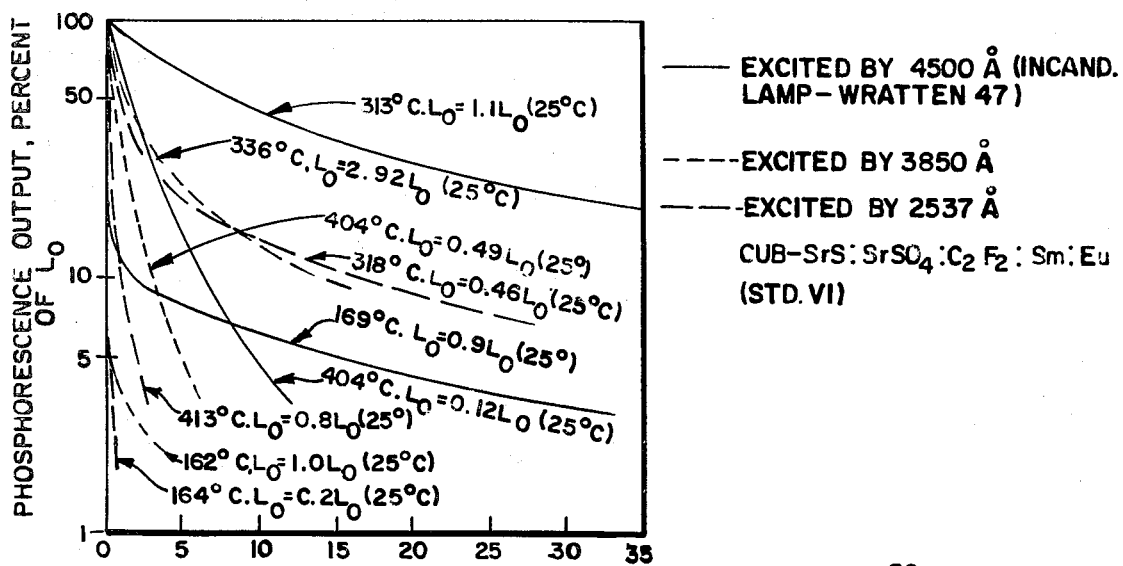
FIG. 4
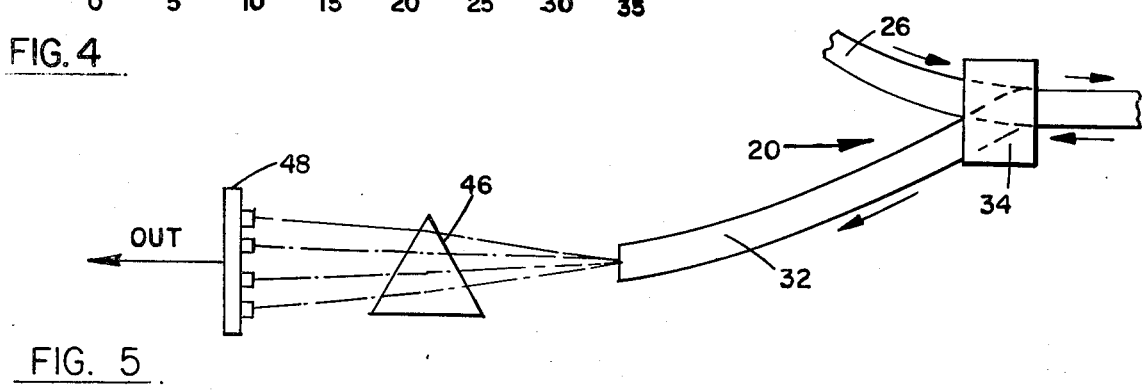
FIG. 5

FIBER OPTIC TEMPERATURE SENSOR

The invention described herein was made in the performance of work under NASA Contract No. NAS3-21005 and is subject to the provisions of section 305 of the National Aeronautics and Space Act of 1958 (72 Stat. 435; 42 U.S.C. 2457).

BACKGROUND OF THE INVENTION

1. Field of the Invention

The invention relates to a fiber optic microsensor that is suitable for remote temperature sensing applications.

2. State of the Prior Art

As is known to those skilled in the art, many temperature sensors are limited in application, because of their relatively large size and slow response time. Moreover, either complex transmission lines or signal conversion apparatus is typically required when the sample from which temperature information is collected is remotely positioned from the sensor body.

A fiber optic temperature sensor would otherwise be characterized as being inexpensive to manufacture, light in weight, capable of carrying wide bandwidth signals and immune to electromagnetic and electrostatic interferences relative to conventional temperature sensors.

Examples of patents which disclose the combination of fiber optic apparatus and a phosphor material are as follows:

U.S. Pat. No. 3,215,846 Nov. 2, 1965
U.S. Pat. No. 3,315,160 Apr. 18, 1967

However, neither of the above recited patents shows or suggests the combination of fiber optic apparatus and a photoluminescent material to be used for the unique purpose of fabricating a temperature sensor, as is disclosed and claimed herein.

SUMMARY OF THE INVENTION

Briefly, and in general terms, a pulse-width modulated luminescent fiber optic temperature sensor is disclosed. One end of a first elongated and flexible fiber optic rod is positioned in proximity to a light source to receive incident light therefrom. The second end of the first optical rod contains a supply of phosphor particles that is adapted to luminesce when exposed to the incident light. The phosphor particles may be either embedded in or coated on the second end of the first rod. A second elongated fiber optic rod may be interconnected between the phosphor bearing end of the first optical rod and a photodetector. Output signals from the photodetector are supplied to signal amplitude regulating means, such as automatic gain control apparatus.

After the phosphor particles are stimulated by the incident light source via the first optical rod, phosphorescent radiation output signals are transmitted to the photodetector via the second optical rod. The photodetector converts the phosphorescent output signals into electrical representations thereof. The signal amplitude regulating means initializes the amplitudes of the electrical signal representations at a desired reference level. A pulse width detector interfaces with the amplitude regulating means to detect the pulse width of the signal representations, which pulse width corresponds to the rate of amplitude decay from the initialized reference level. The rate of amplitude decay of the initialized electrical signal representations of the phosphorescent radiation signals is indicative of the particular temperature that is sensed.

BRIEF DESCRIPTION OF THE DRAWINGS

FIG. 3a shows the wave form of the incident light signal that is applied to the temperature sensor of FIG. 2.

FIGS. 3b–3e show the wave forms of the pulse-width-modulated output signals from the temperature sensor of FIG. 2 for two different temperatures.

FIG. 4 is a logarithmic plot showing the relationship between the decay rate of the output phosphorescent radiation signals and the temperature that is sensed by the temperature sensor of FIG. 2 with respect to the initial amplitude of the output radiation signals for different wavelengths of incident light.

FIG. 5 shows a fiber optic temperature sensor including a supply of phosphor particles that emit phosphorescent output signals, the wavelength (or color) of which is indicative of a sensed temperature.

DESCRIPTION OF THE PREFERRED EMBODIMENT

Figure 1:
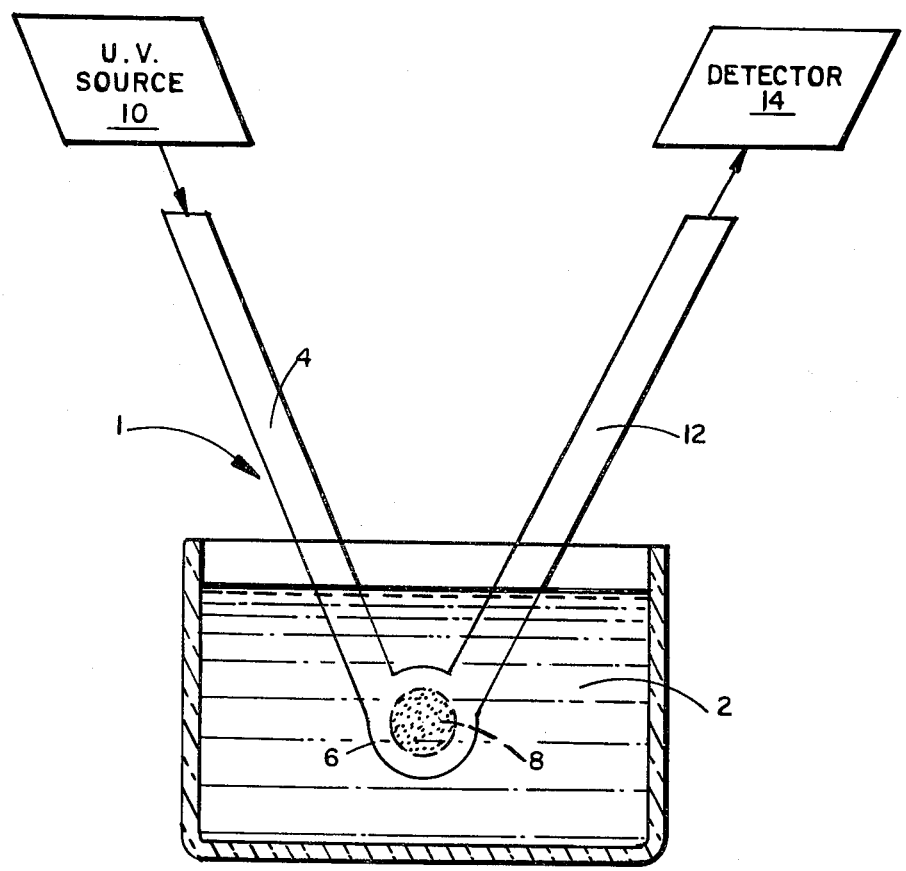
FIG. 1 shows a fiber optic temperature sensor including a supply of phosphor particles embedded therein and being formed in accordance with a first embodiment of the present invention.

FIG. 1 of the drawings illustrates a first preferred embodiment of a micro-sensor 1 that is lightweight, rugged, inexpensive to manufacture, and provides remote temperature monitoring of a sample 2. The temperature sensor 1 comprises an elongated, flexible optical fiber rod 4 that is fabricated from a well known light-conducting material such as, for example, optical glass or plastic. One end of the optical fiber 4 has a globule 6 formed therein. The globule 6 may be fabricated, for example, by heating the first end of rod 4 to form a fused sphere. Although a spherical shape is described, it is to be understood that this is for illustrative purposes only. The first end of rod 4 may be formed into any other suitable geometrical shape. Remote temperature data is provided by a photoluminescent material 8 embedded within the fused sphere 6. By way of example, the photoluminescent material 8 contains phosphor particles. Various types of phosphors may be utilized herein, depending upon the anticipated termperature range to which the sample will be exposed. A suitable light source 10, such as an ultra-violet supply, is positioned adjacent the second end of the optical rod 4 so as to apply incident light thereto.

In operation, the spherical end 6 of the fiber optic termperature sensor 1 is inserted into the sample 2, the temperature of which is to be monitored. Ultra-violet light is transmitted from the source thereof to excite the phosphor particles 8 that are embedded in the fused sphere 6 of optical rod 4. The ultra-violet light causes the phosphor to luminesce. Phosphorescence is the luminescence which occurs shortly after (e.g. within 10 nanoseconds) the termination of the incident exciting light supply. The phosphor particles 8 emit output phosphorescent radiation that is characterized by a particular wave length or color and an amplitude decay rate which are functions of the temperature encountered by the sphere 6. The output radiation may be transmitted from the phosphor particles 8 to a light detector (not shown) that is positioned adjacent the second end of the rod 4. However, instead of a single fiber optic rod 4 to both transmit ultra-violet light and to receive the resultant output phosphorescent radiation signals, one end of a second fiber optic rod 12 may alternatively be connected to the fused sphere 6. In this case, a suitable light detector 14, such as a solid state diode detector, is positioned adjacent the second end of the second optical rod 12 so as to receive the output phosphorescent light signals emanating from the sphere 6. Hence, input ultra-violet light is transmitted from the source 10 thereof to the phosphor particles 8 via rod 4, and output phosphorescent light signals are transmitted from the phosphor particles 8 to the detector 14 via rod 12. Detector 14 is responsive to either the amplitude decay rate or the wavelength (i.e. color) of the output phosphorescent light signals so as to provide an indication of the temperature of the monitored sample 2.

Figure 2:
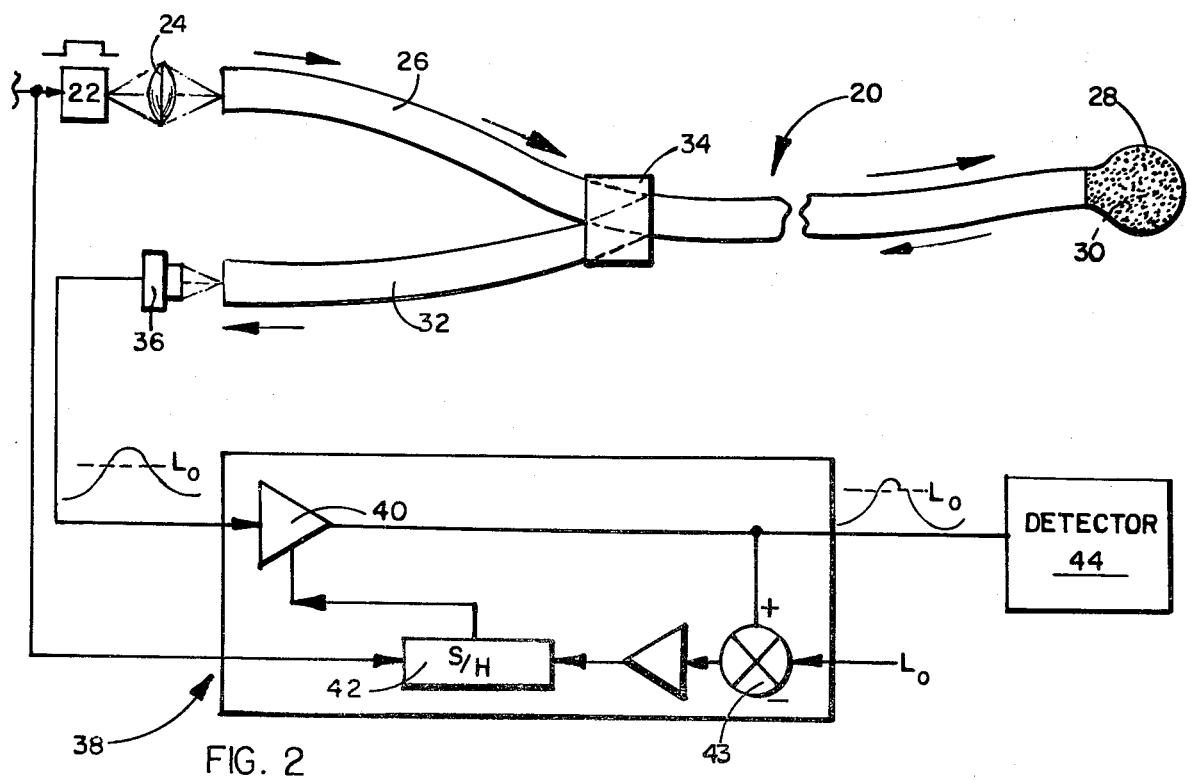
FIG. 2 shows a pulse-width-modulated fiber optic temperature sensor including a supply of phosphor particles coated thereon and being formed in accordance with a second embodiment of the present invention.

FIG. 2 of the drawings shows a schematic for a rugged and inexpensive luminescent fiber optic micro-sensor 20 that is sensitive to temperature and forms another embodiment of the present invention. The temperature sensor 20 includes a light source 22. By way of example, source 22 may be either of an incandescent lamp or a light emitting diode. One end of an elongated, flexible fiber optic rod 26 is positioned in proximity to light source 22 to receive incident radiation therefrom. A suitable lens arrangement 24 is aligned between light source 22 and optical rod 26 so as to focus incident light from source 22 onto the first end of rod 26. The second end of optical rod 26 has a globule 28 formed thereon. As previously disclosed while referring to FIG. 1, globule 28 may be fabricated, for example, by heating the second end of rod 26 to form either a fused sphere or any other suitable geometrical shape. The spherical end of optical rod 26 is covered with a photoluminescent coating 30 so that remote temperature data can be collected. The photoluminescent coating 30 may consist of a phosphor powder adhesive mixture that is bonded or glued to the outer surface of sphere 28. It is to be understood, however, that the phosphor particles 30 may be covered with a suitable protective coating (not shown), such as that formed from optical glass, or the like. As will be explained in greater detail hereinafter, temperature sensor 20 is adapted to provide pulse-width-modulated output signals from the remotely positioned phosphor coated sphere 28 in order to supply accurate information concerning the temperature to which a sample is exposed.

Although only a single fiber optic rod 26 is necessary to mechanize the temperature sensor 20 in accordance with the present embodiment, a second fiber optic rod 32 may, alternatively, be interfaced with the phosphor coated sphere 28 by means of a coupler 34 and optical rod 26. Coupler 34 may be, for example, either of a well known bidirectional coupler or a mechanical electro-optic shutter, or the like. Coupler 34 is adapted to couple both the incident light to the phosphor coated sphere 28 via fiber rod 26 and the output light from sphere 28 to a conventional photodetector 36 via fiber rod 32. As will be recognized by those skilled in the art, some fraction of the incident light from source 22 will couple back to photodetector 36 via coupler 34. Because the amplitude of the incident light is typically more intense than the output signals emanating from phosphor coated sphere 28, even a small fraction of the incident light that is coupled back to the photodetector could produce a larger signal than the amplitude of any output signal to be sensed. Therefore, it is desirable to pulse the incident light source 22 to overcome the undesirable crosscoupling. Moreover, pulsing source 22 is necessary to produce the output signal decay transients which are ultimately measured to provide an indication of temperature.

Optical signals transmitted by rod 32 from sphere 28 are converted into electrical signals by means of the photodetector 36. The output of photodetector 36 is connected to a signal amplitude regulating system 38, such as an automatic gain control apparatus. Signal amplitude regulating system 38 includes a variable gain amplifier 40, a sample/hold network 42 and a comparator 43. Comparator 43 and sample/hold network 42 are serially interconnected in a feedback relationship with amplifier 40 between output and gain control terminals thereof. Sample/hold network 42 is driven by the same input signal which pulses light source 22. The output of photodetector 36 is connected to an input of amplifier 40. The output of amplifier 40 forms an output terminal of the regulating system 38.

In operation, incident light that is emitted from the pulsed light source 22 during a first interval of time is transmitted to the phosphor coated sphere 28 via lens 24, fiber optic rod 26 and coupler 34. FIG. 3a shows the waveform of the incident light pulses that are provided by source 22. The incident light causes the phosphor 28 to luminesce and thereby emit output phosphorescent radiation signals. FIGS. 3b and 3c show respective output wave forms from photodetector 36, which wave forms are representative of the phosphorescent radiation emanating from phosphor coated sphere 28 when sphere 28 is inserted into samples that are exposed to two different temperatures. Referring concurrently to FIGS. 2 and 3, during the presence of the incident light pulses from source 22, the output radiation signal from the phosphor 30 builds up to a saturated value, as indicated by the shaded portion of the representative wave forms of FIGS. 3b and 3c. The actual saturated value of the phosphor during the application of the input light pulse may vary, due to the crosstalk in the coupler 34.

During a succeeding interval of time, designated SAMPLE, the input pulse signal is terminated, and the gain of the variable gain amplifier 40 is adjusted, whereby the amplitude of the output signal of the regulating system 38 is attenuated to a desired reference level, designated $L_0$. This output signal attenuation is accomplished as follows. The termination of the input light pulses during the SAMPLE interval cause sample/hold network 42 to operate in the sample mode. The output signal level of amplifier 40 is thereupon compared to the reference signal level $L_0$ by the comparator 43. The difference between the output level of amplifier 40 and the reference level $L_0$ is amplified and applied from comparator 43 to an input of sample/hold network 42. Sample/hold network 42 applies the amplified difference signal as a negative feedback input signal to a gain control terminal of amplifier 40 so as to substantially eliminate the difference between the output level of amplifier 40 and the $L_0$ reference level.

At the end of the SAMPLE interval of time, the sample/hold network switches into the hold mode during which time the output thereof is maintained at a constant signal level (i.e. the level of the last signal sampled by network 42). Hence, as is illustrated in FIGS. 3d and 3e, the gain of amplifier 40 is accordingly adjusted to provide amplifier 40 with an output signal having an initial amplitude corresponding to the desired reference level $L_0$. Therefore, the output signal wave form (FIG. 3d or 3e) from the amplitude regulating system 38 at the end of the SAMPLE time interval initially has the amplitude $L_0$, regardless of the maximum amplitude of the output signal (FIG. 3b or 3c) from photodetector 36, which amplitude may be affected by the attenuation of the output phosphorescent radiation signal that is transmitted from the coated sphere 28 to the output photodetector 36 via coupler 34 and optical fiber 32.

During that period of time after the termination of the SAMPLE interval, the time that is required for the intensity of the regulating system output signal to decay between two reference amplitudes, conveniently designated $L_1$ and $L_2$ in FIGS. 3d and 3e, is measured by a pulse width detector 44, such as a controlled counter. A physical characteristic of the phosphor 30 that is indicative of temperature is the variation in the rate of decay of the phosphorescent radiation output signal as a function of temperature. Therefore, pulse width detector 44 is connected to the output of variable gain amplifier 40 in order to measure the pulse width corresponding to the decay rate of the output signals from regulating system 38. Since the amplitude of the output signals from amplifier 40 are initially standardized at the level $L_0$ regardless of temperature, the pulse width corresponding to the difference between any two suitable reference amplitudes such as, for example, between $L_0$ and $L_2$ could also be measured. More particularly, as shown in FIG. 3d, amplifier 40 provides an output wave form having a pulse width designated $t_1$ which pulse width corresponds to the respective decay rate between levels $L_1$ and $L_2$ when sphere 28 is exposed to a sample having a first temperature. As shown in FIG. 3e, amplifier 40 provides an output wave form having a longer pulse width designated $t_2$, which pulse width corresponds to the respective decay rate between reference levels $L_1$ and $L_2$ when sphere 28 is exposed to a sample having a second temperature.

It is to be recognized that the temperature sensor 20 which forms the present embodiment is operable in a pulse width modulated system, although the output pulse wave form (FIG. 3d or 3e) does not have a sharp square pulse, as is otherwise expected in a true pulse width modulated system. However, as has been previously pointed out, if either the amplitude of the electrical output signal (FIG. 3b or 3c) from the photodetector 3b or the attenuation of the phosphorescent output signal in optical rod 32 should change, the amplitude regulating system 38 will compensate for the effects thereof.

FIG. 4 of the drawings shows the phosphorescent decay characteristics of a selected luminescent phosphor material that has been excited by an incandescent lamp having wavelengths of 4500 Å, 3650 Å and 2537 Å. Such decay characteristics are explained in greater detail by H. W. Leverenz, *An Introduction to Luminescence in Solids,* John Wiley and Sons, New York, 1950. Examples are provided of the wide variation of output phosphorescent radiation decay rates which result from changing temperature. More particularly, the solid curves in FIG. 4 represent phosphor exitation from a 4500 Å lamp. The decay rates that are obtained correspond to the temperatures of 169° C., 313° C., and 404° C. At 169° C., the intensity of the phosphorescent radiation output signal decays by approximately 20% in a relatively short time interval (e.g. 0.1 seconds or less). At a temperature of 313° C., the intensity of the phosphorescent radiation output signal decays by approximately 10% in one second. Although the particular phosphor employed by the sensor at this last mentioned temperature has a relatively long decay rate, numerous other well known phosphors are available with shorter decay rates and quicker response times that are suitable for utilization herein.

As is also indicated in FIG. 4, the amplitude decay rate is a function of the wave length of the input exciting radiation. Moreover, the initial amplitude $L_0$ of the output phosphorescent signal varies with temperature and the wave length of the incident light source, when compared to the initial amplitude $L_0$ of the output radiation at 25° C. However, as disclosed above, the automatic gain control provided by the signal amplitude regulating system 38 of FIG. 2 automatically compensates for any variation in the initial light intensity $L_0$ of the output phosphorescent radiation.

Another physical characteristic of a phosphorescent material that is indicative of temperature is the shift in wavelength or color of the output phosphorescent radiation that is emitted from the phosphor coating 30 as a function of temperature. In another embodiment of the present invention, FIG. 5 shows a portion of the temperature sensor 20 of FIG. 2 modified so as to be responsive to the color or wavelength of the output phosphorescent radiation. In the present embodiment, pulsed incident excitation is not required for the purpose of initiating transients for pulse width modulation (such as that described while referring to FIG. 2). Nevertheless, pulsed incident excitation may also be utilized in the temperature sensor 20 of FIG. 5 in order to avoid the crosstalk of the incident light signal with the phosphorescent radiation output signal in the coupler 34. Alternatively, however, the pulsed incident and radiation output signals can be separated by establishing a wide frequency or wavelength separation between the exciting illumination and the phosphorescent illumination. In this case, the system would be a wavelength modulated fluorescent detector rather than a pulse-width-modulated phosphorescent detector, as hereinbefore disclosed.

The structure of the fiber optic temperature sensor 20 illustrated in FIG. 5 is identical, in part, to that illustrated in FIG. 2 except that apparatus (e.g. a prism 46) is included to analyze the wavelength pattern of the output optical signal that is transmitted from the phosphor coated sphere (not shown) via coupler 34 and optical rod 32. In the present embodiment, the prism 46 is aligned between the end of optical rod 32 and a photodetector 48 so that the output optical signal is refracted and dispersed to form a display of colors. By way of example, photodetector 48 may include a well known linear array of charge coupled device cells, or the like. The photodetector 48 produces output electrical signals, which signals are representative of the changing temperature encountered by the phosphor coated sphere.

It will be apparent that while a preferred embodiment of the invention has been shown and described, various modifications and changes may be made without departing from the true spirit and scope of the invention. For example, although phosphor particles are either embedded in or coated on a fused sphere that is formed at the sensing end of the temperature sensors illustrated in FIGS. 1 and 2, respectively, it is to be understood that a light transmissive fiber optic rod may also be truncated to form a cleavage plane at the sensing end thereof. Hence, the phosphor particles could be embedded in or coated on the planar surface of the truncated end of the optical rod that forms a temperature sensor disclosed herein. The illustated fused sphere that is attached to the sensing end of a light transmissive optical rod is advantageous for maximizing thermal coupling between the temperature sensor and a sample to be monitored.

Having thus set forth a preferred embodiment of the present invention, what is claimed is:

1. A pulse-width-modulated temperature sensor comprising:
   a source of light pulses,
   a first optical fiber,
   one end of said first optical fiber being positioned in proximity to said source of light pulses to receive light pulses therefrom,
   a supply of photoluminescent material which has an emission amplitude decay rate which is a function of a temperature to be sensed to which said phosphor is exposed, said phosphor being located in proximity to another end of said first optical fiber to receive light therefrom,
   photodetector means,
   a second optical fiber,
   one end of said second optical fiber being positioned to receive light from said photoluminescent material and another end of said second optical fiber being positioned to deliver light to said photodetector means, thereby to conduct output phosphorescent emission signals thereto,
   signal amplitude regulating means connected to an output terminal of said photodetector means to receive therefrom electrical signal representations of the output phosphorescent emission signals and to adjust an initial amplitude thereof to a common signal level, and
   pulse width detector means connected to an output terminal of said signal amplitude regulating means, said pulse width detector being connected to measure the width of the amplitude adjusted signal representations of the output emission signals, whereby the width of said adjusted signal representations is indicative of the temperature to be sensed.

2. A temperature sensor comprising:
   an optical fiber,
   a light source positioned in light supplying relationship to one end of said optical fiber,
   a photoluminescent material in light receiving relationship to another end of said optical fiber, said photoluminescent material being of the type having a luminescence when excited by light supplied thereto from said light source, said luminescence providing an indication of a temperature to be sensed,
   photodetector means responsive to the luminescence of said photoluminescent material, and
   signal amplitude regulating means connected to an output terminal of said photodetector means to receive therefrom electrical signal representations of the luminescence and to initialize the amplitudes of said electrical signal representations to a common signal level.

3. The temperature sensor of claim 2, wherein said signal amplitude regulating means includes:
   a variable gain amplifier to receive from said photodetector means the electrical signal representations of the luminescence, and
   means to control the gain of said amplifier, whereby the amplitudes of the representations of said luminescence are initialized to the common signal level.

4. The temperature sensor recited in claim 3, further including a pulse width detector connected to an output terminal of said variable gain amplifier for measuring the width of the amplitude initialized electrical signal representations of said luminescence, whereby the width of said electrical signal representations is indicative of the temperature to be sensed.

* * * * *